US012423990B1

(12) United States Patent
Silver et al.

(10) Patent No.: US 12,423,990 B1
(45) Date of Patent: Sep. 23, 2025

(54) DETECTING AND RESPONDING TO PARKING BEHAVIORS IN AUTONOMOUS VEHICLES

(71) Applicant: Waymo LLC, Mountain View, CA (US)

(72) Inventors: David Harrison Silver, Millbrae, CA (US); David Ian Franklin Ferguson, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/144,943

(22) Filed: May 9, 2023

Related U.S. Application Data

(63) Continuation of application No. 17/406,693, filed on Aug. 19, 2021, now abandoned, which is a continuation of application No. 16/373,214, filed on Apr. 2, 2019, now Pat. No. 11,126,868, which is a continuation of application No. 15/597,379, filed on May 17, 2017, now Pat. No. 10,293,822, which is a
(Continued)

(51) Int. Cl.
*G06V 20/58* (2022.01)
*B60W 60/00* (2020.01)

(52) U.S. Cl.
CPC ......... *G06V 20/58* (2022.01); *B60W 60/0025* (2020.02)

(58) Field of Classification Search
CPC .............. G06V 20/58; B60W 60/0025; B60W 60/0027; B60W 30/08; B60W 30/09; B60W 30/095; B60W 30/0953; B60W 30/0956

See application file for complete search history.

(56) References Cited

U.S. PATENT DOCUMENTS

| 8,700,251 | B1 | 4/2014 | Zhu et al. |
| 8,818,681 | B1 | 8/2014 | Dolgov et al. |
| 8,965,621 | B1 | 2/2015 | Urmson et al. |

(Continued)

FOREIGN PATENT DOCUMENTS

EP        2562060 A1    2/2013

OTHER PUBLICATIONS https://www.drivesmartbc.ca/backing/stopping-parallel-park (Year: 2012).*

(Continued)

*Primary Examiner* — Aaron L Troost
(74) *Attorney, Agent, or Firm* — Botos Churchill IP Law LLP

(57) ABSTRACT

Aspects of the disclosure relate controlling autonomous vehicles or vehicles having an autonomous driving mode. More particularly, these vehicles may identify and respond to other vehicles engaged in a parallel parking maneuver by receiving sensor data corresponding to objects in an autonomous vehicle's environment and including location information for the objects over time. An object corresponding to another vehicle in a lane in front of the first vehicle may be identified from the sensor data. A pattern of actions of the other vehicle identified form the sensor data is used to determine that the second vehicle is engaged in a parallel parking maneuver based on a pattern of actions exhibited by the other vehicle identified from the sensor data. The determination is then used to control the autonomous vehicle.

19 Claims, 10 Drawing Sheets

Related U.S. Application Data continuation of application No. 14/837,548, filed on Aug. 27, 2015, now Pat. No. 9,682,707.

(56) References Cited

U.S. PATENT DOCUMENTS

| | | |
|---|---|---|
| 9,495,874 B1 | 11/2016 | Zhu et al. |
| 9,682,707 B1 | 6/2017 | Silver et al. |
| 11,415,997 B1 | 8/2022 | Dolan |
| 2012/0083960 A1 | 4/2012 | Zhu et al. |
| 2014/0236414 A1 | 8/2014 | Droz et al. |
| 2015/0112571 A1* | 4/2015 | Schmudderich ...... B60W 30/14 |
| | | 701/1 |
| 2015/0120137 A1* | 4/2015 | Zeng ................... B60R 21/0134 |
| | | 701/41 |
| 2015/0127222 A1* | 5/2015 | Cunningham, III ... B60Q 5/006 |
| | | 701/41 |
| 2015/0160653 A1 | 6/2015 | Cheatham et al. |
| 2015/0266477 A1 | 9/2015 | Schmudderich |
| 2022/0318464 A1 | 10/2022 | Xu et al. |

OTHER PUBLICATIONS

"How to Parallel Park", Available online at : <https://www.wikihow.com/Parallel-Park>, <http://web.archive.org/web/20150729085354>, Jul. 29, 2015, 5 pages.

* cited by examiner

DETECTING AND RESPONDING TO PARKING BEHAVIORS IN AUTONOMOUS VEHICLES

CROSS-REFERENCE TO RELATED APPLICATIONS

The present application is a continuation of U.S. patent application Ser. No. 17/406,693, filed Aug. 19, 2021, which is a continuation of U.S. patent application Ser. No. 16/373,214, filed Apr. 2, 2019, now issued as U.S. Pat. No. 11,126,868, which is a continuation of U.S. patent application Ser. No. 15/597,379, filed May 17, 2017, now issued as U.S. Pat. No. 10,293,822, which is a continuation of U.S. patent application Ser. No. 14/837,548, filed Aug. 27, 2015, now issued as U.S. Pat. No. 9,682,707, the disclosures of which are hereby incorporated herein by reference.

BACKGROUND

Autonomous vehicles, such as vehicles which do not require a human driver, may be used to aid in the transport of passengers or items from one location to another. An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decided when to speed up, slow down, stop, turn, etc. These decisions are used to maneuver between locations but also to interact with and avoid collisions with other objects along the way.

BRIEF SUMMARY

One aspect of the disclosure provides a method for identifying and responding to vehicles engaged in a parallel parking maneuver. The method includes receiving, by one or more computing devices, sensor data corresponding to objects in a first vehicle's environment. The sensor data includes location information for the objects over time. The first vehicle has an autonomous driving mode where the one or more computing devices maintain a default distance between the first vehicle and other vehicles in a same lane. The method also includes identifying, by the one or more computing devices, from the sensor data an object corresponding to a second vehicle in a lane in front of the first vehicle; determining, by the one or more computing devices, that the second vehicle is engaged in a parallel parking maneuver based on a pattern of actions exhibited by the second vehicle identified from the sensor data; and when the second vehicle is determined to be engaged in a parallel parking maneuver, controlling, by the one or more computing devices, the first vehicle in the autonomous driving mode by maintaining a second distance between the first vehicle and the second vehicle that is greater than the default distance.

In one example, the method also includes accessing, by the one or more computing devices, detailed map information identifying designated parking areas. The pattern of actions includes stopping adjacent to a designated parking area identified in the detailed map information. In this example, the pattern of actions includes turning on a turn signal when the second vehicle is adjacent to the designated parking area. Alternatively or in addition, the pattern of actions includes pulling forward and backing into the designated parking area. In addition or alternatively, once the second vehicle is located at least partially within the designated parking area the method also includes determining when there is sufficient room in the lane to pass the second vehicle and when sufficient room is determined to be in the lane, no longer maintaining the second distance and moving the first vehicle around and past the second vehicle. In another example, the pattern of actions includes pulling adjacent to an opening between two parked vehicles adjacent to the lane and the opening is larger than a size of the second vehicle indicated in the sensor data. In this example, the pattern of actions includes stopping adjacent to one of the two vehicles when there is no other vehicle within a given distance of the second vehicle in the lane in front of the second vehicle. In another example, determining, by the one or more computing devices, that the second vehicle is engaged in a parallel parking maneuver is further based on whether there are any other vehicles within a given distance in front of the second vehicle.

Another aspect of the disclosure provides a system for identifying and responding to vehicles engaged in a parallel parking maneuver. The system includes one or more computing devices having one or more processors. The one or more processors are configured to receive sensor data corresponding to objects in a first vehicle's environment. The sensor data includes location information for the objects over time. The first vehicle has an autonomous driving mode where the one or more computing devices maintain a default distance between the first vehicle and other vehicles in a same lane. The one or more processors are also configured to identify from the sensor data an object corresponding to a second vehicle in a lane in front of the first vehicle; determine that the second vehicle is engaged in a parallel parking maneuver based on a pattern of actions exhibited by the second vehicle identified from the sensor data; and when the second vehicle is determined to be engaged in a parallel parking maneuver, control the first vehicle in the autonomous driving mode by maintaining a second distance between the first vehicle and the second vehicle that is greater than the default distance.

In one example, the system also includes a sensor configured to generate the sensor data and provide the sensor data to the one or more computing devices. In another example, the system also includes the first vehicle. In another example, the one or more processors are further configured to access detailed map information identifying designated parking areas. The pattern of actions includes stopping adjacent to a designated parking area identified in the detailed map information. In this example, the pattern of actions includes turning on a turn signal when the second vehicle is adjacent to the designated parking area. Alternatively or in addition, the pattern of actions includes pulling forward and backing into the designated parking area. In addition or alternatively, the one or more processors are further configured to once the second vehicle is located at least partially within the designated parking area, determine when there is sufficient room in the lane to pass the second vehicle, and when sufficient room is determined to be in the lane, no longer maintain the second distance and moving the first vehicle around and past the second vehicle. In another example, the pattern of actions includes pulling adjacent to an opening between two parked vehicles adjacent to the lane and the opening is larger than a size of the second vehicle indicated in the sensor data. In this example, the pattern of actions includes stopping adjacent to one of the two vehicles when there is no other vehicle within a given distance of the second vehicle in the lane in front of the second vehicle. In another example, the one or more processors are further configured to determine that the second vehicle is engaged in a parallel parking maneuver further based on whether there are any other vehicles within a given distance in front of the second vehicle.

A further aspect of the disclosure provides a non-transitory computer-readable recording medium on which instructions are stored. The instructions, when executed by one or more processors, cause the one or more processors to perform a method of identifying and responding to vehicles engaged in a parallel parking maneuver. The method includes receiving sensor data corresponding to objects in a first vehicle's environment. The sensor data includes location information for the objects over time. The first vehicle has an autonomous driving mode where the one or more computing devices maintain a default distance between the first vehicle and other vehicles in a same lane. The method also includes identifying from the sensor data an object corresponding to a second vehicle in a lane in front of the first vehicle; determining that the second vehicle is engaged in a parallel parking maneuver based on a pattern of actions exhibited by the second vehicle identified from the sensor data; and when the second vehicle is determined to be engaged in a parallel parking maneuver, controlling the first vehicle in the autonomous driving mode by maintaining a second distance between the first vehicle and the second vehicle that is greater than the default distance.

In one example, the method also includes accessing detailed map information identifying designated parking areas, and wherein the pattern of actions includes stopping adjacent to a designated parking area identified in the detailed map information.

DETAILED DESCRIPTION

Overview

Figure 1:
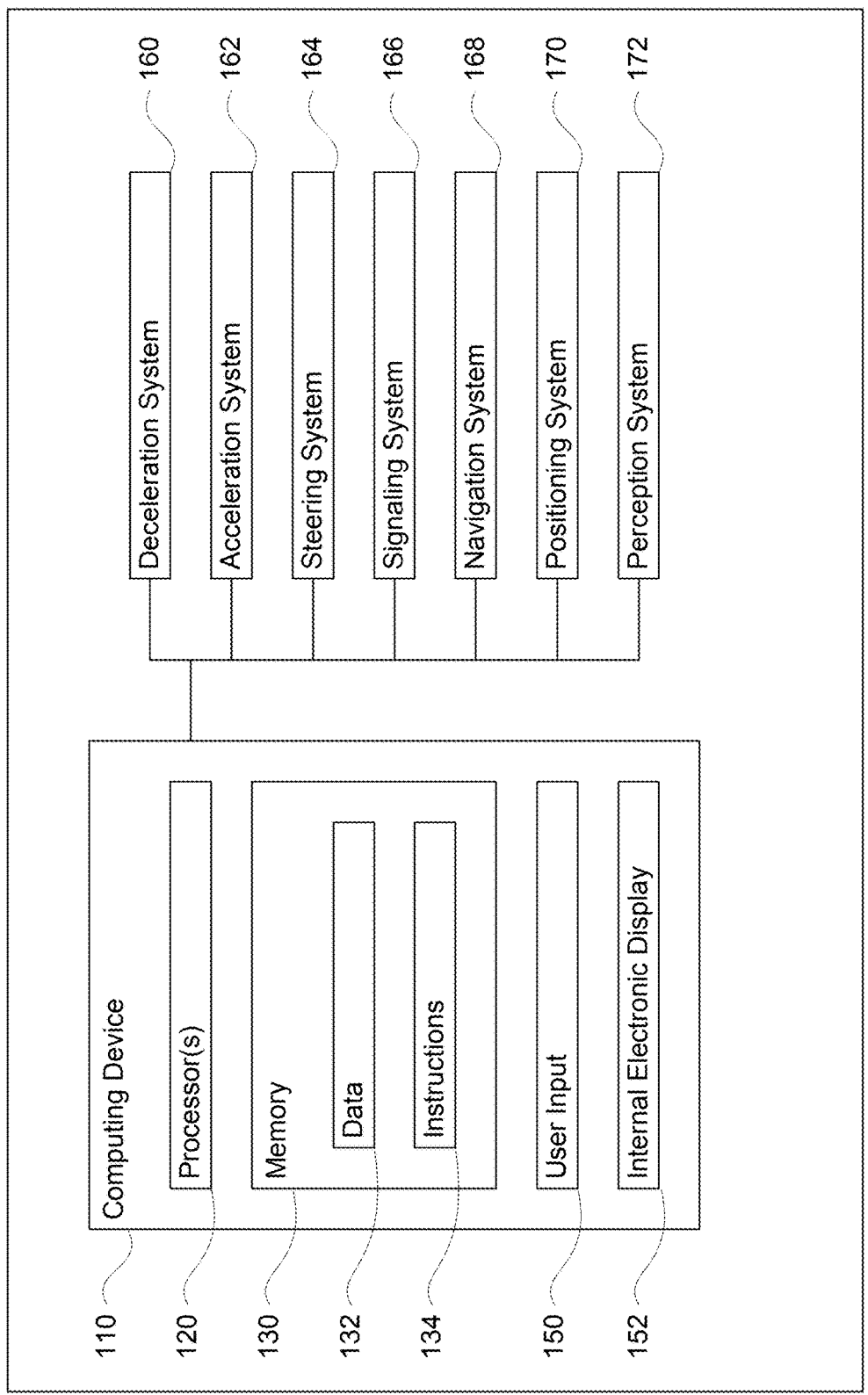
FIG. 1 is a functional diagram of a system in accordance with aspects of the disclosure.

The technology relates to enabling autonomous vehicles or vehicles having an autonomous driving mode to recognize and respond to other vehicles that are engaged in a parallel parking maneuver. As an example, the autonomous driving mode allows the vehicle's steering, acceleration and deceleration to be controlled by a computing device as opposed to a driver. Without the ability to identify such vehicles, an autonomous vehicle may end up stopping immediately behind another vehicle, preventing the other vehicle from completing the parallel parking maneuver. In other examples, the autonomous vehicle may be forced to wait until the other vehicle has completely moved out of the roadway before the autonomous vehicle's computer would be able to move around the other vehicle. This can cause awkward situations which could annoy or frustrate the drivers of the other vehicle or a vehicle that is behind the autonomous vehicle.

In order to recognize that another vehicle is engaged in a parallel parking maneuver, an autonomous vehicle's one or more computing devices may receive sensor data corresponding to objects in the vehicle's environment. This sensor data may include location information for the objects over time. At least some of these objects may correspond to other vehicles which may be engaged in a parallel parking maneuver.

In addition to sensor data, the autonomous vehicle may have access to pre-stored information that the computing device may use to maneuver the vehicle. For instance, this pre-stored information may include a default distance for stopping behind another vehicle. This default distance may depend upon various factors such as whether the autonomous vehicle is parked, whether the other vehicle is moving or stopped, whether the autonomous vehicle is approaching a traffic signal light or stop sign which the autonomous vehicle must obey. In addition, the pre-stored information may include map information identifying designated parking areas or areas in the map that have been tagged or otherwise identified as parking spots either for parallel or other types of parking. These areas may be "legal" parking spots or simply areas where a vehicle would be permitted to pull over in an emergency.

The vehicle's computing device may use the sensor data to identify objects in the vehicle's environment and track the location and changes in orientation of those objects over time. For example, the computing device may identify an object as vehicle in a lane in front of the autonomous vehicle based on the location and characteristics of the object. Then location and changes in orientation of the object may be tracked to generate a list of actions. As an example, a list of actions may include changes in speed of the other vehicle such as slowing down or speeding up, making a partial or full turn, turning on or off turn signals, etc.

The list of actions may be compared to a predefined pattern of actions that are likely to be exhibited by a vehicle engaged in a parallel parking maneuver. The predefined pattern of actions may include stopping adjacent to a designated parking area, turning on a turn signal when the other vehicle is adjacent to a designated parking area, pulling forward and backing into the designated parking area, pulling adjacent to an opening (that may or may not be larger than a size of the other vehicle) between two vehicles adjacent to the lane of the autonomous vehicle and that are not in motion, stopping adjacent to one of the two vehicles when there are no additional vehicle within a given distance of the other vehicle in the lane in front of the other vehicle, slowing down or stopping when there are no additional vehicles within a given distance in front of the other vehicle, etc.

If there is a sufficient number of actions that overlap between the predefined pattern of actions and the list of actions, such as two or three or more or less, the vehicle's computing device may determine that the other vehicle is engaged in a parallel parking maneuver. The autonomous vehicle's computing device may then use this information to control the autonomous vehicle. For example, rather than using the default distance, the computing device may allow a greater distance between the other vehicle and the autonomous vehicle. This would reduce the likelihood of the autonomous vehicle preventing the other vehicle from completing the parallel parking maneuver.

In addition, once the other vehicle is at least partially within a designated parking area, the vehicle's computing device may determine when there is sufficient room in the lane to pass the second vehicle. Once there is sufficient room, the computing device many no longer maintain the greater distance, but rather move the autonomous vehicle around the other vehicle. By doing so, this may prevent the autonomous vehicle from stopping and waiting too long for the other vehicle to complete the parallel parking maneuver and reduce the likelihood of delays to other drivers or vehicles located behind the autonomous vehicle in the same lane.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, boats, airplanes, helicopters, lawnmowers, recreational vehicles, amusement park vehicles, farm equipment, construction equipment, trams, golf carts, trains, and trolleys. The vehicle may have one or more computing devices, such as computing device 110 containing one or more processors 120, memory 130 and other components typically present in general purpose computing devices.

The memory 130 stores information accessible by the one or more processors 120, including data 132 and instructions 134 that may be executed or otherwise used by the processor(s) 120. The memory 130 may be of any type capable of storing information accessible by the processor(s), including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The data 132 may be retrieved, stored or modified by processor(s) 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The one or more processors 120 may be any conventional processors, such as commercially available CPUs. Alternatively, the one or more processors may be a dedicated device such as an ASIC or other hardware-based processor, such as a field programmable gate array (FPGA). Although FIG. 1 functionally illustrates the processor(s), memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may have all of the components normally used in connection with a computing device such as the processor and memory described above, as well as a user input 150 (e.g., a mouse, keyboard, touch screen and/or microphone) and various electronic displays (e.g., a monitor having a screen, a small LCD touch-screen or any other electrical device that is operable to display information). In this example, the vehicle includes an internal electronic display 152. In this regard, internal electronic display 152 may be located within a cabin of vehicle 100 and may be used by computing device 110 to provide information to passengers within the vehicle 100.

In one example, computing device 110 may be an autonomous driving computing system incorporated into vehicle 100. The autonomous driving computing system may capable of communicating with various components of the vehicle as needed in order to control the vehicle in fully autonomous (without input from a driver) as well as semi-autonomous (some input from a driver) driving modes.

Figure 2:
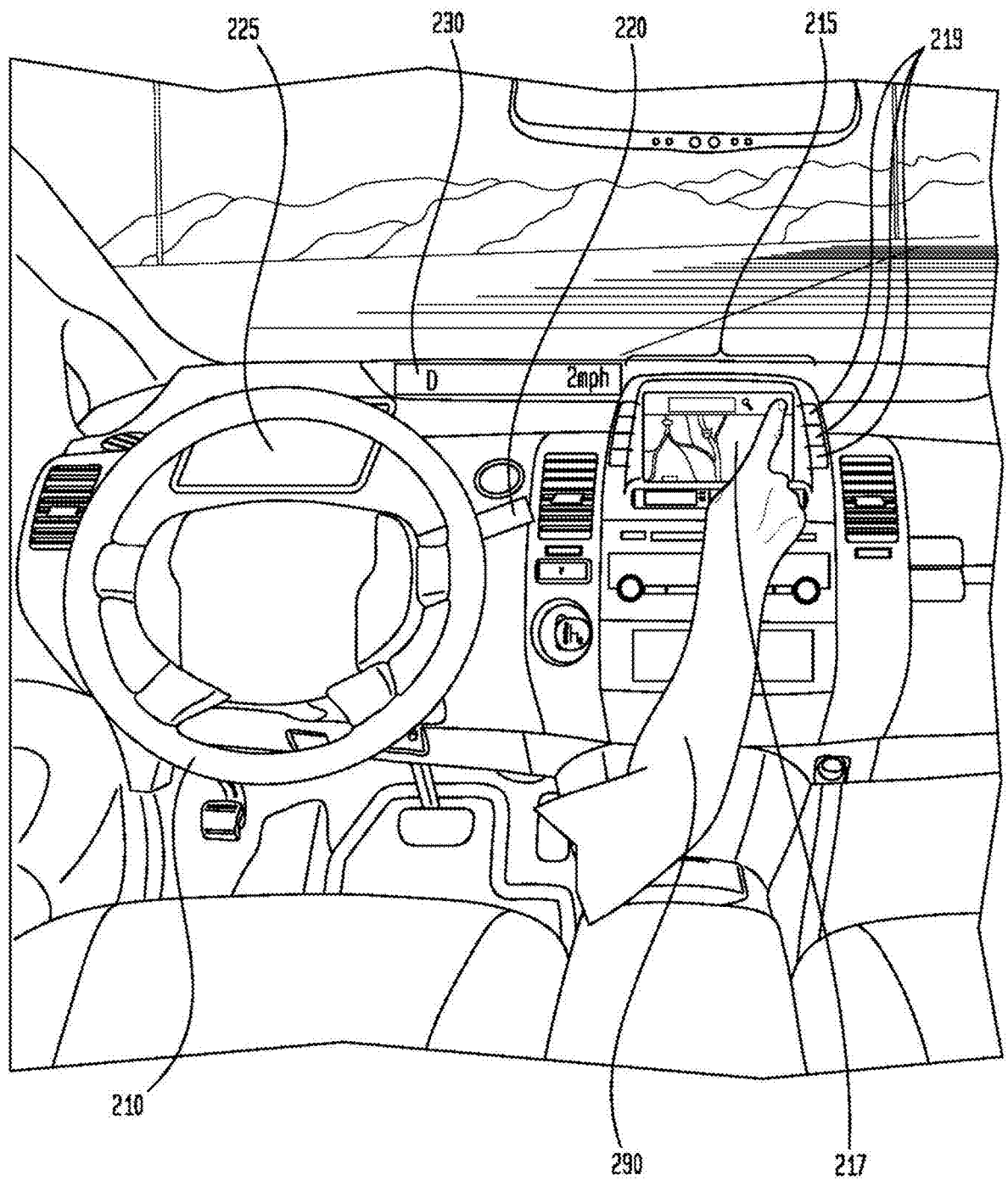
FIG. 2 is an interior of an autonomous vehicle in accordance with aspects of the disclosure.

As an example, FIG. 2 depicts an interior design of a vehicle having autonomous, semiautonomous, and manual (continuous input from a driver) driving modes. In this regard, the autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (again, which may be a part of electronic display 152), or button inputs 219, for activating or deactivating one or more autonomous driving modes and for enabling a driver or passenger 290 to provide information, such as a navigation destination, to the computing device 110.

Returning to FIG. 1, when engaged, computer 110 may control some or all of these functions of vehicle 100 and thus be fully or partially autonomous. It will be understood that although various systems and computing device 110 are shown within vehicle 100, these elements may be external to vehicle 100 or physically separated by large distances.

In this regard, computing device 110 may be in communication various systems of vehicle 100, such as deceleration system 160, acceleration system 162, steering system 164, signaling system 166, navigation system 168, positioning system 170, and perception system 172, such that one or more systems working together may control the movement, speed, direction, etc. of vehicle 100 in accordance with the instructions 134 stored in memory 130. Although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 3:
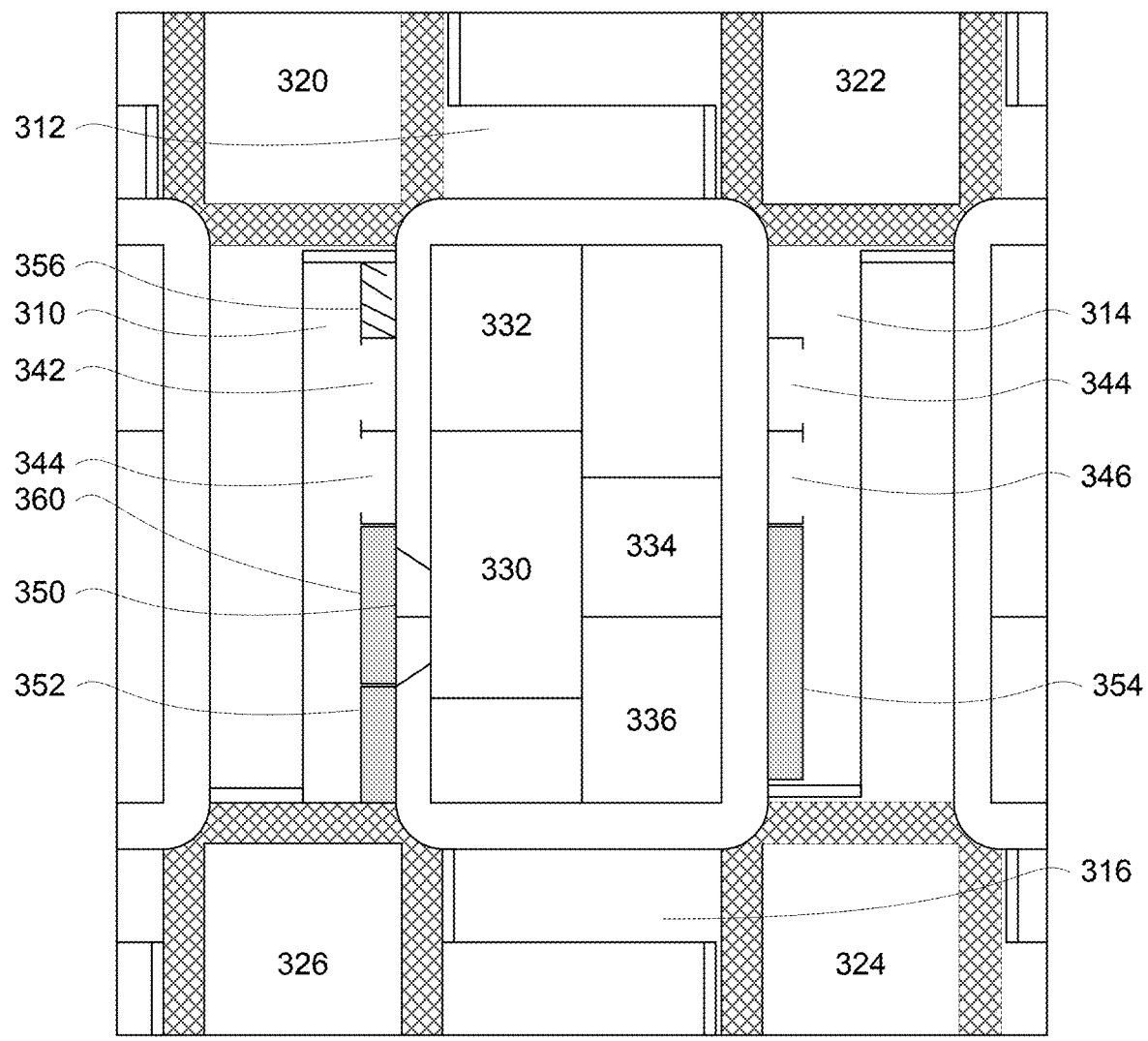
FIG. 3 is an example of detailed map information in accordance with aspects of the disclosure.

FIG. 3 is an example of detailed map information 300 for a city block. In this example, the detailed map information includes a plurality of different features that identify the shape and location of various features such as lanes 310-316, intersections 320-326, buildings 330-336, designated parking areas 340-346, a driveway entrance (for example to a parking garage or other location) 350, shoulder areas 352-354, and no parking zone 356. Together, these features correspond to a single city block.

Figure 4:
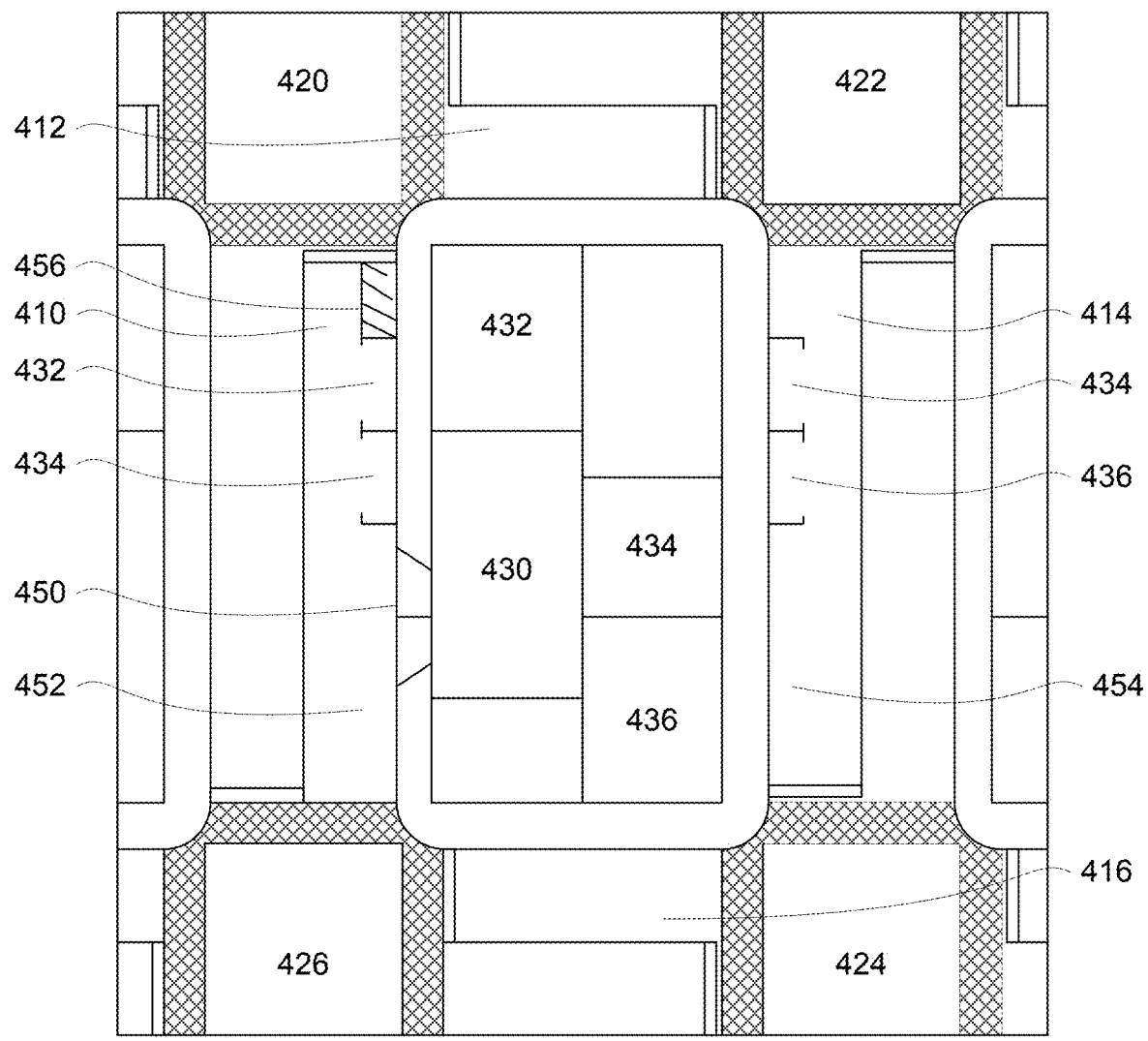
FIG. 4 is an example diagram of a city block corresponding to the detailed map information of FIG. 3 in accordance with aspects of the disclosure.

FIG. 4 is an example bird's eye view 400 of the city block of FIG. 3. In this example, the features of view 400 may correspond to the shapes and locations of the various features of the detailed map information. For example, lanes 410-416 may correspond to lanes 310-316, intersections 420-426 may correspond to lanes 320-326, buildings 420-426 may correspond to buildings 330-336, parking spaces 440-446 may correspond to designated parking areas 340-346, driveway entrance 450 may correspond to driveway entrance 350, shoulder areas 452-454 may correspond to shoulder areas 352-354, and no parking zone 456 may correspond to no parking zone 356. Together, these features correspond to a single city block.

The detailed map information may also include information identifying areas that are predesignated as parking areas. For example, returning to FIG. 3, the areas corresponding to parking spaces 340-346 may each be associated with a tag identifying the area as a predesignated parking area. Some areas may also be predesignated as temporary parking areas or areas which may be suitable for brief short term stops to wait or drop off a passenger such shoulders 352 and 354 an area such as area 360 in front of driveway 760. Similarly, other areas, such as no parking zone 356 may be associated with tags identifying the area a no parking zone where vehicles should neither stop nor wait. This predesignation may be performed manually by human review, automatically based on the characteristics of areas (for example, whether there are parking lines defining a parking space or diagonal lines representing a no parking zone, whether an area is sufficiently large for a vehicle of a particular size), machine learning, or a combination of these.

The detailed map information used by the various computing devices and systems of vehicle 100 in order to maneuver the vehicle 100. Although the example herein is shown pictorially for a right-lane drive location, the detailed map information may be stored in any number of different ways including databases, roadgraphs, etc. and may include maps of left-lane drive locations as well.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting and performing analysis on objects external to the vehicle such as other vehicles, obstacles in the roadway, traffic signals, signs, trees, etc. For example, the perception system 172 may include lasers, sonar, radar, one or more cameras, or any other detection devices which record data which may be processed by computing device 110. In the case where the vehicle is a small passenger vehicle such as a car, the car may include a laser mounted on the roof or other convenient location as well as other sensors such as cameras, radars, sonars, and additional lasers. The computing device 110 may control the direction and speed of the vehicle by controlling various components. By way of example, if the vehicle is operating completely autonomously, computing device 110 may navigate the vehicle to a location using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine or by applying brakes by deceleration system 160), change direction (e.g., by turning the front or rear wheels of vehicle 100 by steering system 164), and signal such changes (e.g. by lighting turn signals of signaling system 166).

Figure 5:
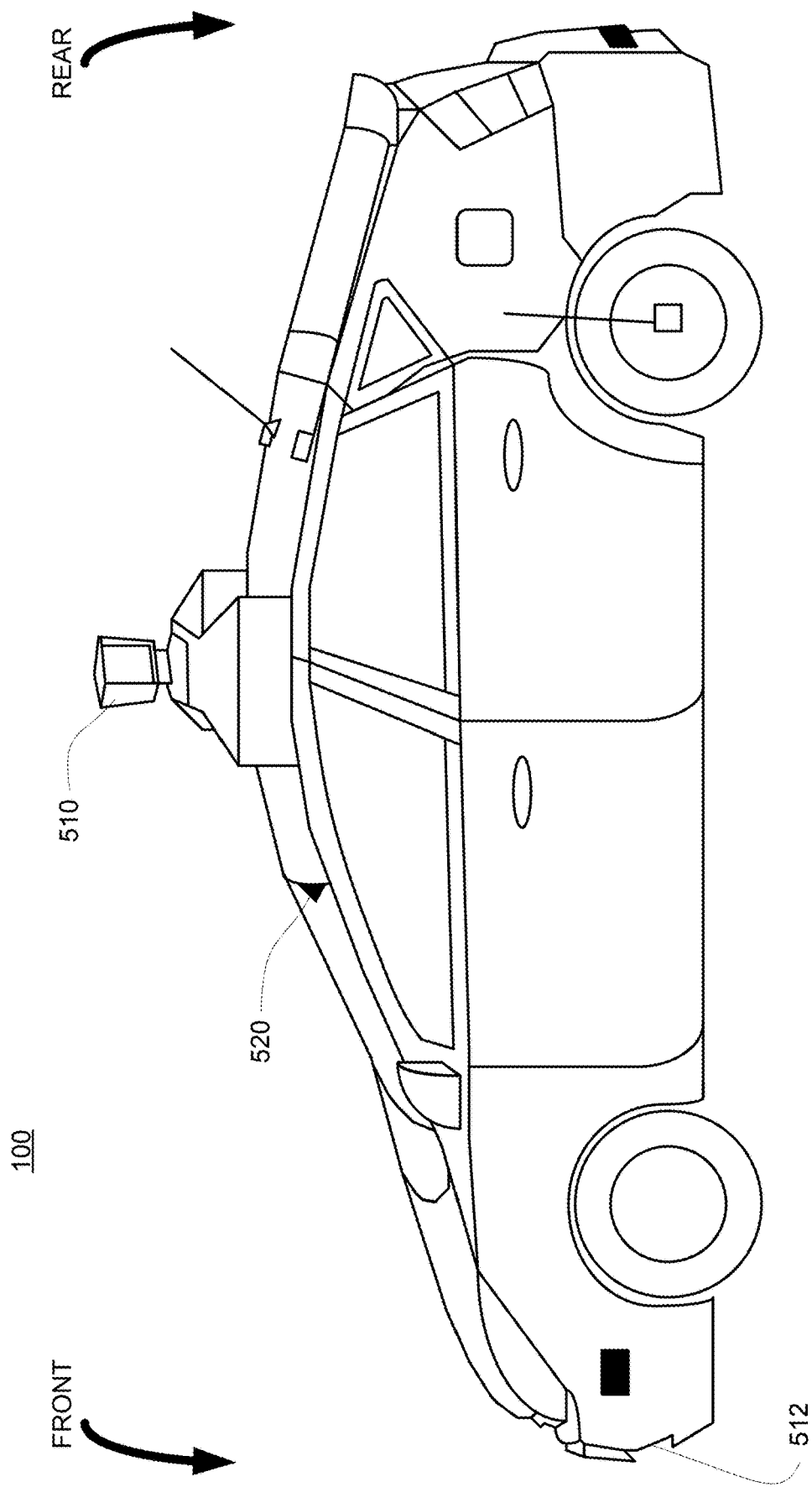
FIG. 5 is an exterior view of an autonomous vehicle in accordance with aspects of the disclosure.

FIG. 4 is an example external view of vehicle 100 described above. As shown, various components of the perception system 172 may be positioned on or in the vehicle 100 in order to better detect external objects while the vehicle is being driven. In this regard, one or more sensors, such as laser range finders 510 and 512 may be positioned or mounted on the vehicle. As an example, the one or more computing devices 110 (not shown) may control laser range finder 510, e.g., by rotating it 180 degrees. In addition, the perception system may include one or more cameras 520 mounted internally on the windshield of vehicle 100 to receive and analyze various images about the environment. In addition to the laser range finder 510 is positioned on top of perception system 172 in FIG. 5, and the one or more cameras 520 mounted internally on the windshield, other detection devices, such as sonar, radar, GPS, etc., may also be positioned in a similar manner.

Returning to FIG. 1, data 132 may also store a default distance for stopping vehicle 100 behind other vehicles. This default distance may depend upon various factors such as whether the autonomous vehicle is parked, whether the other vehicle is moving or stopped, whether the autonomous vehicle is approaching a traffic signal light or stop sign which autonomous vehicle must obey. For example, a default stopping distance may be 3 or more or less meters when vehicle 100 is approaching a traffic signal or a stop sign which vehicle 100 must obey.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 6:
FIG. 6 is an example diagram of the city block of FIG. 4 with vehicles in accordance with aspects of the disclosure.

As noted above, in order to recognize that another vehicle is engaged in a parallel parking maneuver, an autonomous vehicle's one or more computing devices may receive data from the vehicle's perception system 172. This data may include sensor data generated by the various sensors of the vehicle. The sensor data may also correspond to objects in the vehicle's environment. For example, as shown in FIG. 6, the perception system 172 of vehicle 100 may detect various objects in the vehicle's environment, including for example, vehicle 610.

The vehicle's computing device 110 may use the received sensor data to identify information about specific objects, such as whether those objects are in the same lane as and in front of the autonomous vehicle. For example, the sensor data may identify an object corresponding to vehicle 610 as having an object type of a vehicle. Using the location information from the sensor data in combination with the detailed map information, the vehicle's computing device may also determine that vehicle 610 is located in a lane in front of vehicle 100 based on the location and characteristics (size shape) of the object as identified from the sensor data.

As the sensors collect data over time, the sensor data may identify location information for the objects and how that location information changes over time. For example, because vehicle 100's sensors may detect the movements of vehicle 610 over time, the perception system 172 may provide the vehicle's computing device 110 with information about how the characteristics of vehicle 610 may have changed over time, including, for example, changes in heading, location, speed, etc.

Figure 8:
FIG. 8 is an example combination of detailed map information and sensor date in accordance with aspects of the disclosure.

The movements of an object may be determined and tracked from the received sensor data. For example, the movements of vehicle 610 may be tracked based on the locations identified in the sensor data. Over time the relative changes in these location may be used to determine the speed and heading of vehicle 610 and the changes in these characteristics over time may be identified from the sensor data. For example, FIG. 8 is an example of tracking data 710 and 720, corresponding to the tracked locations of vehicles 610 and 100, respectively. In this regard, each of points 711-725 represents a tracked location of vehicle 100 or vehicle 610. For simplicity, in this example, the difference in time between each consecutive point corresponding to a tracked location is the same (though this may not necessarily be the case). In other words, the difference in time between points 711 and 712 is the same as that between points 721 and 722, 712 and 713, 722 and 723, etc. Accordingly, in this example, each point 711-715 and 721-725 represents a different location of vehicles 610 and vehicle 100, respectively.

Figure 7:
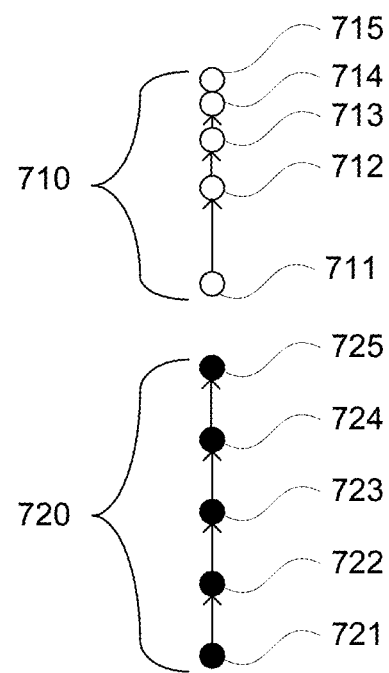
FIG. 7 is an example of tracked locations of vehicles in accordance with aspects of the disclosure.

This tracking may be used to generate a list of actions for a tracked object. As an example, the tracked object's movements may be subdivided into individual actions, based on for example, comparison to models of object behaviors and also comparison to the detailed map information. In other words, the models may describe how different types of turns should look, stopping, moving in different directions, etc. As an example, a list of actions may include changes in speed of the other vehicle such as slowing down or speeding up, making a partial or full turn, turning on or off turn signals, etc. Returning to the example of FIG. 7, points 721-725 indicate that the speed and direction of movement of vehicle 100 remains constant over the period during which points 721-725 were generated by the vehicle's sensors. At the same time, points 711-715 indicate that the speed of vehicle 610 decreases as the points become closer together. Again, the heading of vehicle 610 over the period during which points 711-715 were generated by the vehicle's sensors remains constant. For example, as can be seen in FIG. 8, points 711-715 indicate not only that the vehicle 610 is slowing down, but also that the vehicle 610 is slowing down adjacent to designated parking areas 342 and 344 (parking spaces 442 and 444) when there are no objects immediately in front of vehicle 610. Thus an example list of actions for vehicle 610 over the period during which points 711-715 were generated by the vehicle's sensors may include slowing down or stopping when there are no additional vehicles within a given distance in front of the other vehicle.

Other information detected by the perception system 172 may also be used to determine the list of actions. As an example, using image recognition techniques on images captured by a camera of the vehicle 100 during the period when points 711-715 are captured, whether the vehicle 610 has turned on a turn signal turning on a turn signal when the vehicle 610 is adjacent to designated parking area 342 and/or 344 (parking spaces 442 and/or 444) may be determined. Turning on a turn signal when the other vehicle is adjacent to a designated parking area may therefore also be included in the example list of actions for vehicle 610.

The list of actions may be compared to a predefined pattern of actions that are likely to be exhibited by a vehicle engaged in a parallel parking maneuver. The predefined pattern of actions may include stopping adjacent to a designated parking area, turning on a turn signal when the other vehicle is adjacent to a designated parking area, pulling forward and backing into the designated parking area, pulling adjacent to an opening (that may or may not be larger than a size of the other vehicle) between two vehicles adjacent to the lane of the autonomous vehicle and that are parked or not in motion, stopping adjacent to one of the two vehicles when there are no additional vehicle within a given distance of the other vehicle in the lane in front of the other vehicle, slowing down or stopping when there are no additional vehicles within a given distance in front of the other vehicle, etc. If there is a sufficient number of actions that overlap between the predefined pattern of actions and the list of actions, such as two or three or more or less, the vehicle's computing device may determine that the other vehicle is engaged in a parallel parking maneuver. As an example, the number of actions that overlap may be compared to a threshold value. If the number of actions that overlaps meets the threshold value, the vehicle's computing device may determine that the other vehicle is engaged in a parallel parking maneuver. Returning to the example of vehicle 610, the list of actions includes turning on a turn signal when the other vehicle is adjacent to a designated parking area and slowing down or stopping when there are no additional vehicles within a given distance in front of the other vehicle. Comparing this list of actions to the predefined pattern of actions indicates that there are at least two actions that overlap. In this regard, if the threshold value is 2, greater than 1, or greater than or equal to 1, the vehicle's computing device 110 may determine that vehicle 610 is engaged in a parallel parking maneuver.

Alternatively, if the threshold value is greater than 2 or greater than or equal to 3, then the vehicle's computing device 110 may determine that vehicle 610 is not engaged in a parallel parking maneuver. Of course, if the next location of the vehicle 610 after point 715 as identified in the sensor data indicates that the vehicle 610 has stopped and is still located at the location of point 715, this may indicate an additional action that the vehicle has stopped adjacent to a designated parking area. Accordingly, the number of overlapping actions would now include 3 actions and the threshold would be met. As such, the vehicle's computing device 110 may determine that vehicle 610 is engaged in a parallel parking maneuver.

The overlap of multiple such actions may make it very likely that a vehicle is attempting to a parallel parking maneuver. However, additional considerations may also be important to an accurate determination. For example, there may be some instances a vehicle may go through a number of overlapping actions but may still not be engaged in a parallel parking maneuver. To avoid false determinations, the vehicle's computing device may also determine whether these actions are occurring in a place where, through detecting parked vehicles or other objects, there is a possible space in which a vehicle can parallel park. In addition, this space may be required to be one which a vehicle would have to back into, as opposed to pulling forward. These additional considerations may be a separate "check" or simply incorporated into the predefined pattern of actions, such as the action of pulling adjacent to an opening (that may or may not be larger than a size of the other vehicle) between two vehicles adjacent to the lane of the autonomous vehicle that are parked or are not in motion.

The autonomous vehicle's computing device may then use the determination that a vehicle is engaged in a parallel parking maneuver to control the autonomous vehicle. For example, rather than using the default distance, the computing device may allow a greater distance between the other vehicle and the autonomous vehicle. If the default distance is 3 meters, the default distance may be doubled to 6 meters or tripled to 9 meters. For example, turning to FIG. 9, line 910 may represent a default distance. Once the vehicle's computing device 110 determines that vehicle 610 is engaged in a parallel parking maneuver, the vehicle's computing device may increase the default distance as indicated by line 920. This would reduce the likelihood of vehicle 100 pulling too close to vehicle 610 and preventing vehicle 610 from completing the parallel parking maneuver.

Figure 9:
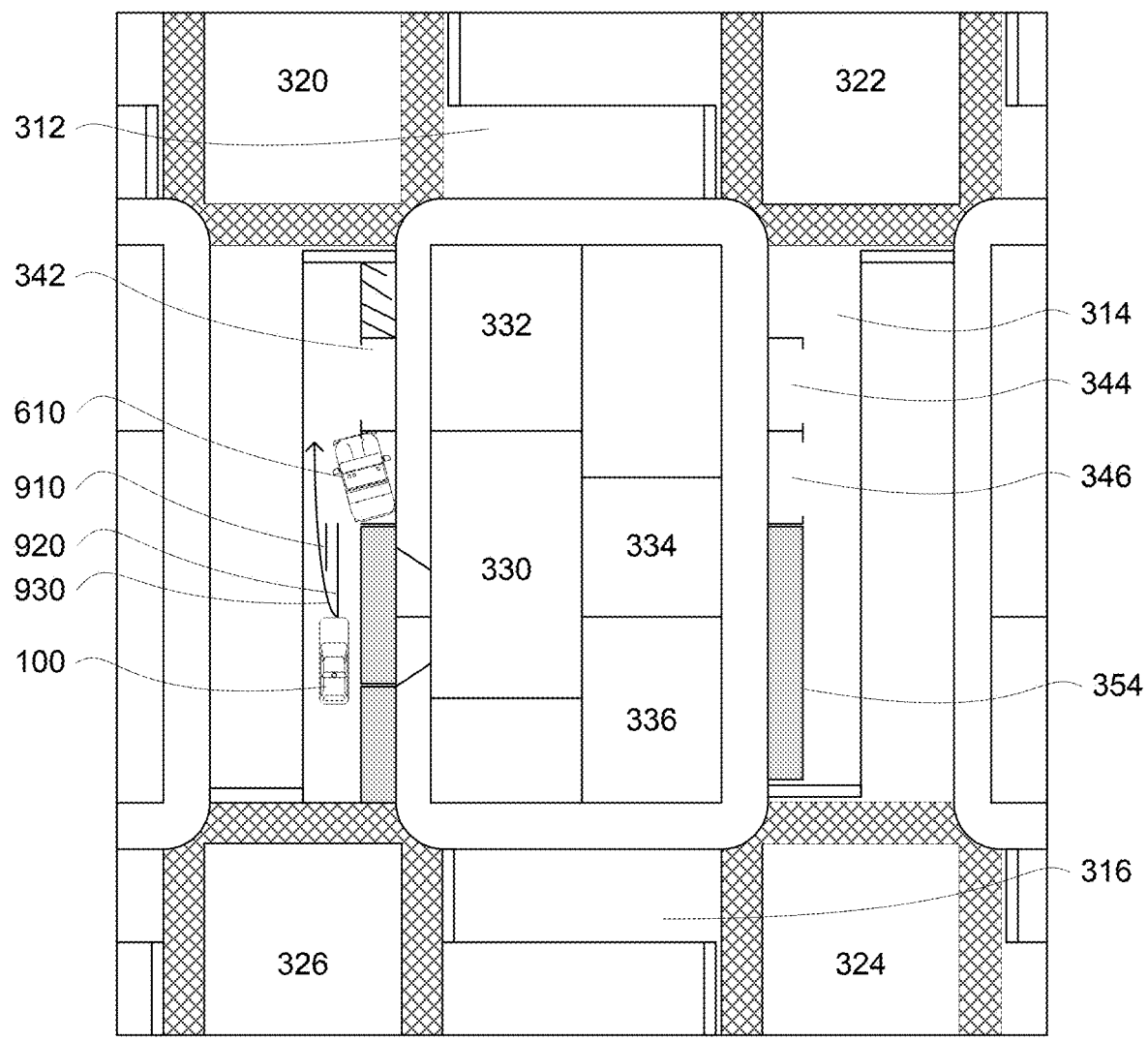
FIG. 9 is another example combination of detailed map information and sensor date in accordance with aspects of the disclosure.

In addition, once the other vehicle, here vehicle 610, is at least partially within a designated parking area such as designated parking area 344 (parking space 444) as shown in FIG. 9, the vehicle's computing device may determine when there is sufficient room in the lane to pass the second vehicle. Once there is sufficient room, the computing device many no longer maintain the increased default distance, but rather move the around vehicle 610, for example, following the path of arrow 930. By doing so, this may prevent vehicle from stopping and waiting too long for the vehicle 610 to complete the parallel parking maneuver and reduce the likelihood of delays to other drivers or vehicles located behind the vehicle 100 in the same lane.

Figure 10:
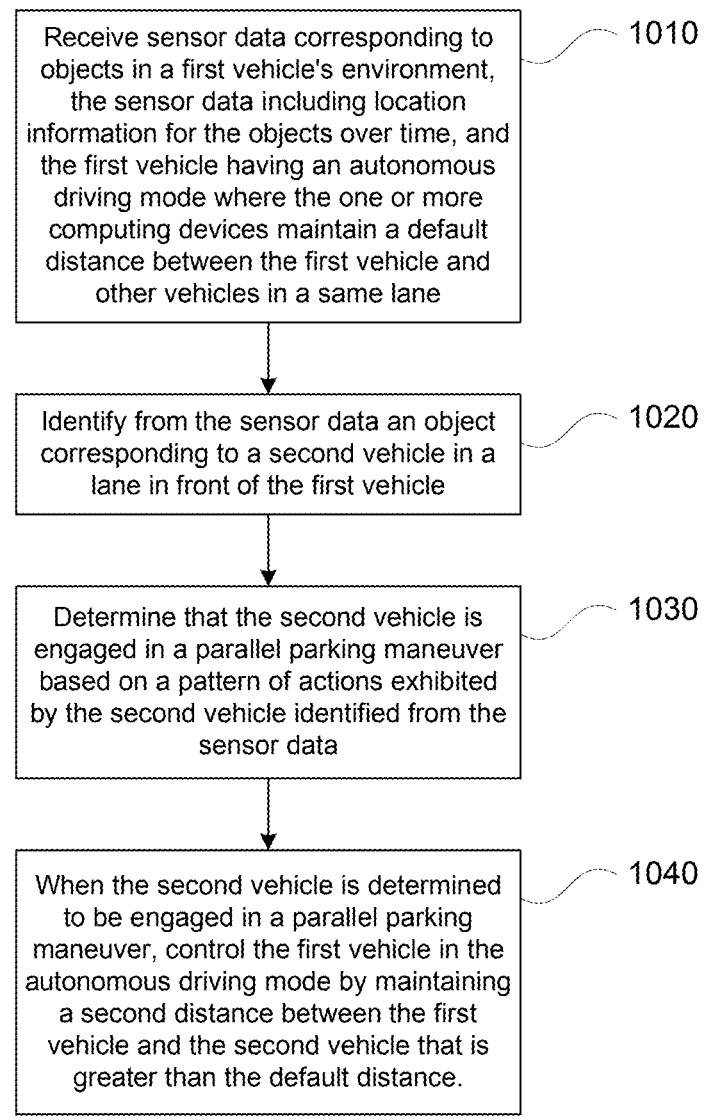
FIG. 10 is an example flow diagram in accordance with aspects of the disclosure.

FIG. 10 is an example flow diagram 1000 which depicts some of the aspects described above which may be performed by one or more computing devices such as one or more computing devices 110 of vehicle 100. In this example, sensor data corresponding to objects in a first vehicle's environment is received at block 1010. The sensor data includes location information for the objects over time, and the first vehicle has an autonomous driving mode where the one or more computing devices maintain a default distance between the first vehicle and other vehicles in a same lane. At block 1020, an object corresponding to a second vehicle in a lane in front of the first vehicle is identified. The second vehicle is determined to be engaged in a parallel parking maneuver based on a pattern of actions exhibited by the second vehicle identified from the sensor data at block 1030. When the second vehicle is determined to be engaged in a parallel parking maneuver, the first vehicle is controlled in the autonomous driving mode by maintaining a second distance between the first vehicle and the second vehicle that is greater than the default distance at block 1040.

The features described above may also be used to detect and respond to different types of parking maneuvers. For example, such features may be used to detect and understand when another vehicle has stopped in a lane and parked or pulled over and parked where the parking would not necessarily be considered a parallel parking maneuver. As an example, a vehicle exhibiting a threshold number of actions that overlap with a pattern of actions including slowing down, stopping, opening a door of the vehicle, and a passenger entering or exiting the vehicle may be identified as engaging in a parking maneuvers.

Other cues may also be used to determine whether an object is engaging in a parking maneuver such as the type of object. For example, where a vehicle exhibits the threshold number of action that overlap with the pattern of actions, the type of the vehicle may be used to further determine that the parking maneuver is a short term parking behavior or rather, one that will likely have a relatively short duration. For example, the sensor data may indicate that the object type of an object engaged in a parking maneuver is a bus or a van. A bus or van may follow such parking maneuvers when dropping off or picking up a passenger or passengers, but is very likely to move from the stopped position as soon as the passenger is clear of the vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only

The invention claimed is:

1. A method for identifying and responding to vehicles engaged in a parallel parking maneuver, the method comprising:
   receiving, by one or more processors, over a period of time, sensor data corresponding to objects in an environment of a first vehicle, the sensor data including location information for the objects over the period of time, wherein the first vehicle does not require any driver;
   identifying, by the one or more processors, from the sensor data an object corresponding to a second vehicle in a lane in front of the first vehicle;
   identifying, by the one or more processors, a pattern of actions being performed by the second vehicle over the period of time;
   determining, by the one or more processors, that the second vehicle is engaged in a parallel parking maneuver based on the pattern of actions and whether the pattern of actions was performed in a place where there is a possible space in which the second vehicle can parallel park based on map information of the first vehicle;
   based on the determination that the second vehicle is engaged in a parallel parking maneuver, determining when there is sufficient space to pass the second vehicle; and
   based on the determination of when there is sufficient space to pass the second vehicle, controlling, by the one or more processors, the first vehicle in an autonomous driving mode, without input from the driver, in order to move the first vehicle around and past the second vehicle before the second vehicle has completed the parallel parking maneuver.

2. The method of claim 1, wherein controlling the first vehicle includes moving the first vehicle around and past the second vehicle before the second vehicle is able to complete the parallel parking maneuver.

3. The method of claim 1, wherein the controlling the first vehicle includes moving the first vehicle around and past the second vehicle to reduce delays caused to a third vehicle.

4. The method of claim 1, wherein the determining whether the pattern of actions was performed in a place where there is a possible space in which the second vehicle can parallel park further includes determining that a vehicle adjacent to the lane of the first vehicle is parked.

5. The method of claim 1, wherein the determining that the pattern of actions was performed in a place where there is a possible space in which the second vehicle can parallel park includes determining whether the second vehicle is able to pull into the possible space.

6. The method of claim 1, wherein the determining that the pattern of actions was performed in a place where there is a possible space in which the second vehicle can parallel park includes determining whether the second vehicle would have to back into to park as opposed to pull forward into to park.

7. The method of claim 1, wherein the determining that the pattern of actions was performed in a place where there is a possible space in which the second vehicle can parallel park is further based on whether the possible space is larger than a size of the second vehicle.

8. The method of claim 1, wherein the determining that the pattern of actions was performed in a place where there is a possible space in which the second vehicle can parallel park is further based on whether the possible space is between two vehicles that are not in motion.

9. The method of claim 1, wherein the determining that the pattern of actions was performed in a place where there is a possible space in which the second vehicle can parallel park is further based on whether the possible space is between two vehicles that are adjacent to a lane in which the first vehicle is currently located.

10. The method of claim 1, further comprising, prior to determining that there is sufficient space to pass the second vehicle, maintaining at least a predetermined distance between the first vehicle and the second vehicle.

11. The method of claim 10, further comprising, identifying the predetermined distance in response to the determination that the second vehicle is engaged in a parallel parking maneuver.

12. The method of claim 11, wherein the predetermined distance is greater than a default distance for maintaining space between the first vehicle and other vehicles in a same lane.

13. The method of claim 1, wherein the determining, by the one or more processors, that the second vehicle is engaged in a parallel parking maneuver is further based on whether there are any other vehicles within a given distance in front of the second vehicle.

14. A system for identifying and responding to vehicles engaged in a parallel parking maneuver, the system comprising one or more processors configured to:
   receive, over a period of time, sensor data corresponding to objects in an environment of a first vehicle, the sensor data including location information for the objects over the period of time, wherein the first vehicle does not require any driver;
   identify from the sensor data an object corresponding to a second vehicle in a lane in front of the first vehicle;
   identify a pattern of actions being performed the second vehicle over the period of time;
   determine that the second vehicle is engaged in a parallel parking maneuver based on the pattern of actions and whether the pattern of actions was performed in a place where there is a possible space in which the second vehicle can parallel park based on map information of the first vehicle; and
   based on the determination that the second vehicle is engaged in a parallel parking maneuver, determine when there is sufficient space to pass the second vehicle; and
   based on the determination of when there is sufficient space to pass the second vehicle, control the first vehicle in an autonomous driving mode in order to move the first vehicle around and past the second vehicle before the second vehicle has completed the parallel parking maneuver.

15. The system of claim 14, wherein the one or more processors are further configured to control the first vehicle further by moving the first vehicle around and past the second vehicle before the second vehicle is able to complete the parallel parking maneuver.

16. The system of claim 14, wherein the one or more processors are further configured to control the first vehicle further by moving the first vehicle around and past the second vehicle to reduce delays caused to a third vehicle.

17. The system of claim 14, wherein the one or more processors are further configured to, prior to determining that there is sufficient space to pass the second vehicle, maintain at least a predetermined distance between the first vehicle and the second vehicle.

18. The system of claim 17, wherein the one or more processors are further configured to identify the predetermined distance in response to the determination that the second vehicle is engaged in a parallel parking maneuver.

19. A non-transitory, computer readable medium on which instructions are stored, the instructions, when executed by one or more processors, cause the one or more processors to perform a method of identifying and responding to vehicles engaged in a parallel parking maneuver, the method comprising:

receiving, over a period of time, sensor data corresponding to objects in an environment of a first vehicle, the sensor data including location information for the objects over the period of time, wherein the first vehicle does not require any driver;

identifying from the sensor data an object corresponding to a second vehicle in a lane in front of the first vehicle;

identifying a pattern of actions being performed the second vehicle over the period of time;

determining that the second vehicle is engaged in a parallel parking maneuver based on the pattern of actions and whether the pattern of actions was performed in a place where there is a possible space in which the second vehicle can parallel park based on map information of the first vehicle; and based on the determination that the second vehicle is engaged in a parallel parking maneuver, determining when there is sufficient space to pass the second vehicle; and based on the determination of when there is sufficient space to pass the second vehicle, controlling the first vehicle in an autonomous driving mode in order to move the first vehicle around and past the second vehicle before the second vehicle has completed the parallel parking maneuver.

\* \* \* \* \*